(12) United States Patent
Jung

(10) Patent No.: US 10,422,714 B2
(45) Date of Patent: Sep. 24, 2019

(54) SENSOR MANAGEMENT BASED ON SURFACE TYPE

(71) Applicant: EMPIRE TECHNOLOGY DEVELOPMENT LLC, Wilmington, DE (US)

(72) Inventor: Yang-Won Jung, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 607 days.

(21) Appl. No.: 14/962,221

(22) Filed: Dec. 8, 2015

(65) Prior Publication Data

US 2017/0160163 A1     Jun. 8, 2017

(51) Int. Cl.
*G01L 1/26*        (2006.01)
*G01L 25/00*     (2006.01)
*G01L 27/00*     (2006.01)

(52) U.S. Cl.
CPC ............ *G01L 25/00* (2013.01); *G01L 27/002* (2013.01)

(58) Field of Classification Search
CPC ......... G16H 10/60; G06F 3/016; G06F 3/011; G06F 3/014; G01P 13/00; G06K 9/00342; G01L 25/00; G01L 27/002
USPC ......... 73/152.52; 345/158; 600/301; 702/98, 702/104, 138, 150
See application file for complete search history.

(56) References Cited

U.S. PATENT DOCUMENTS

| | | | |
|---|---|---|---|
| 5,661,245 A * | 8/1997 | Svoboda ........... | A61M 5/16854 73/726 |
| 7,188,439 B2 | 3/2007 | DiBenedetto et al. | |
| 8,454,437 B2 | 6/2013 | Dugan et al. | |
| 8,758,273 B2 * | 6/2014 | Kubiak ................ | A61B 5/1036 36/110 |
| 9,616,290 B2 * | 4/2017 | Purks .................. | A63B 24/0062 |
| 9,772,245 B2 * | 9/2017 | Besling ................ | G01L 9/0073 |
| 2003/0214485 A1 * | 11/2003 | Roberts ................ | G06F 3/0414 345/173 |

(Continued)

FOREIGN PATENT DOCUMENTS

| | | |
|---|---|---|
| CN | 2057062 U | 5/1990 |
| CN | 201740611 U | 2/2011 |

(Continued)

OTHER PUBLICATIONS

Wiggermann, N., "The Effect of Flooring Surface Compliance on Plantar Pressures and Discomfort During Prolonged Standing," Ph.D. dissertation, The University of Michigan, pp. 1-115 (2011).

*Primary Examiner* — John E Breene
*Assistant Examiner* — Jeffrey P Aiello
(74) *Attorney, Agent, or Firm* — Christensen O'Connor Johnson Kindness PLLC

(57) ABSTRACT

Technologies are generally described that relate to managing and/or generating sensor data. An example method may include receiving output data generated by a pressure sensor. The method may also include determining surface data, indicative of a surface type associated with a force applied to a surface of the pressure sensor, based on the output data. Furthermore, the method may include adjusting the output data based on the surface data to facilitate generating adjusted output data indicative of an adjusted pressure value generated by the pressure sensor.

19 Claims, 12 Drawing Sheets

(56) References Cited

U.S. PATENT DOCUMENTS

| | | | |
|---|---|---|---|
| 2007/0186657 A1* | 8/2007 | Sato | G01L 9/0022 73/708 |
| 2009/0299583 A1* | 12/2009 | Dell'Eva | F16H 59/68 701/51 |
| 2010/0103093 A1* | 4/2010 | Izumi | G06F 3/0334 345/156 |
| 2010/0308846 A1* | 12/2010 | Camus | G01L 1/142 324/679 |
| 2011/0098857 A1* | 4/2011 | Yoshiike | B62D 57/032 700/246 |
| 2011/0140897 A1* | 6/2011 | Purks | A61B 5/1038 340/573.1 |
| 2012/0057430 A1* | 3/2012 | Rouquette | G01V 1/189 367/24 |
| 2013/0150755 A1* | 6/2013 | Kubiak | A61B 5/1036 600/592 |
| 2014/0062703 A1* | 3/2014 | Purks | A61B 5/1122 340/573.1 |
| 2014/0277739 A1* | 9/2014 | Kornbluh | B25J 9/0006 700/260 |
| 2014/0379132 A1* | 12/2014 | Fudaba | B25J 9/1689 700/260 |
| 2015/0298513 A1* | 10/2015 | Taki | B60C 23/061 73/146.2 |
| 2016/0264394 A1* | 9/2016 | Hershberger | B67D 1/0801 |
| 2016/0350819 A1* | 12/2016 | Mitchell | G06Q 30/0621 |
| 2017/0038905 A1* | 2/2017 | Bijamov | G06F 3/0414 |
| 2017/0055854 A1* | 3/2017 | Choucair | A61B 5/0205 |
| 2017/0095207 A1* | 4/2017 | Thomas | A61B 5/1107 |

FOREIGN PATENT DOCUMENTS

| | | |
|---|---|---|
| CN | 101828794 B | 2/2012 |
| WO | 2008153912 A1 | 12/2008 |
| WO | 2014100045 A1 | 6/2014 |

* cited by examiner

SENSOR MANAGEMENT BASED ON SURFACE TYPE

TECHNICAL FIELD

The subject disclosure relates generally to managing data associated with a sensor.

BACKGROUND

The use of sensors is becoming more common in electronic devices and consumer products. For example, sensors may be an important aspect of wearable technology. One example of wearable technology is a shoe (e.g., a "smart shoe") that includes pressure sensor(s) and/or other electronics for measuring force distribution, tracking movement, etc. However, wearable technology is generally employed by a user in various environments. For example, a shoe (e.g., a "smart shoe") that includes pressure sensor(s) and/or other electronics can be employed by a user in various indoor environments and/or various outdoor environments. Therefore, data captured by wearable technology (e.g., captured by sensor(s) included in wearable technology) can be inconsistent with respect to the various environments in which the wearable technology is used.

SUMMARY

In various, non-limiting embodiments, systems, devices, methods and/or computer-readable storage media that manage data associated with a sensor are described herein.

In some embodiments, a method may include receiving output data generated by a pressure sensor, determining surface data, indicative of a surface type associated with a force applied to a surface of the pressure sensor, based on the output data, and adjusting the output data based on the surface data to facilitate generating adjusted output data indicative of an adjusted pressure value generated by the pressure sensor.

In another embodiment, a system includes a sensor component, a surface estimation component and a calibration component. The sensor component receives output data generated based on first pressure data associated with a first surface of a pressure sensor and second pressure data associated with a second surface of the pressure sensor. The surface estimation component determines surface data, indicative of a type of floor surface employed to generate the first pressure data, based on the output data. The calibration component calibrates the output data based on the surface data to generate calibrated output data indicative of a calibrated pressure value generated by the pressure sensor.

In yet another embodiment, a computer-readable storage device stores executable instructions that, in response to execution, cause a device including a processor to perform operations. The operations include: receiving pressure data generated by a sensor, determining reference pressure data, indicative of a type of surface associated with a pressure applied to the sensor, based on the pressure data, and generating modified pressure data, indicative of a modified pressure value generated by the sensor, by modifying the pressure data based on the reference pressure data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, various non-limiting embodiments are further described with reference to the accompanying drawings in which:

DETAILED DESCRIPTION

Figure 1:
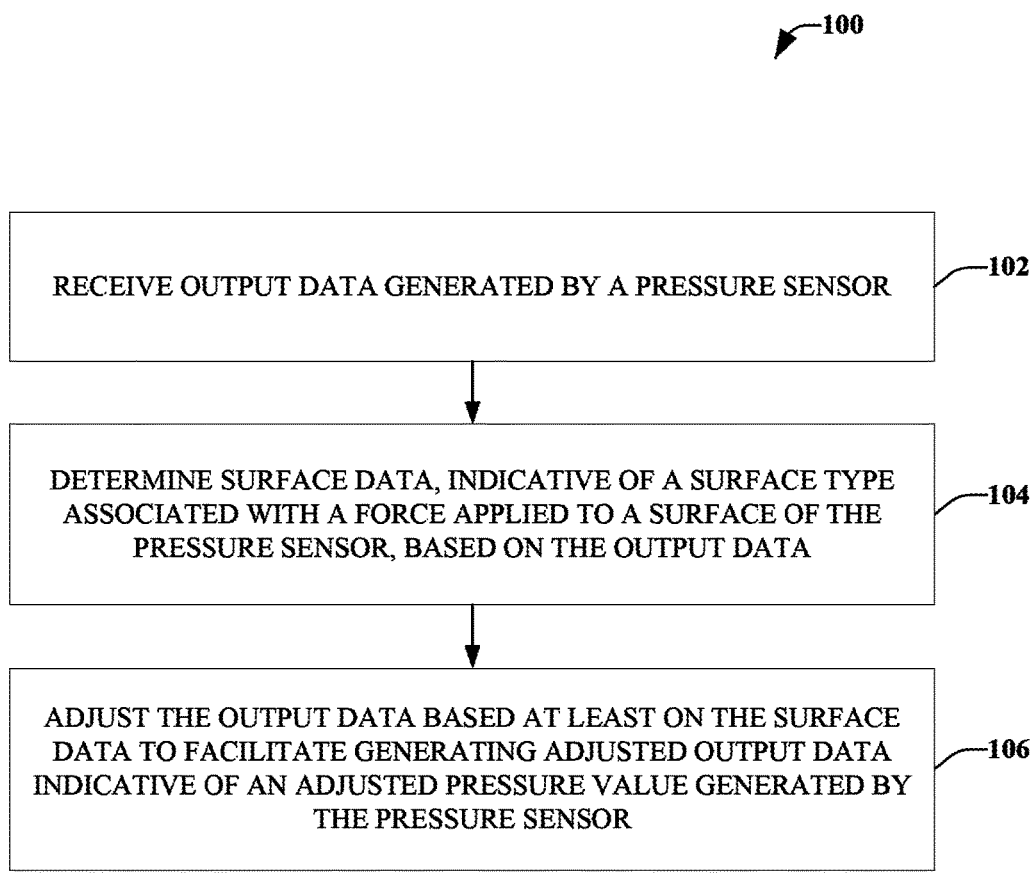
FIG. 1 illustrates an example, non-limiting embodiment of a method to manage and/or generate sensor data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, may be arranged, substituted, combined, separated, and designed in a wide variety of different configurations, all of which are explicitly contemplated herein.

The use of sensors is becoming more common in electronic devices and consumer products. For example, sensors may be an important aspect of wearable technology. One example of wearable technology is a shoe (e.g., a "smart shoe") that includes pressure sensor(s) and other electronics for measuring force distribution, tracking movement, etc. However, wearable technology is generally employed by a user in various environments. For example, a shoe (e.g., a "smart shoe") that includes pressure sensor(s) and/or other electronics can be employed by a user in various indoor environments and/or various outdoor environments. Therefore, data captured by wearable technology (e.g., captured by sensor(s) included in wearable technology) can be inconsistent with respect to the various environments in which the wearable technology is used.

To address these and/or other issues, one or more embodiments of the present disclosure provide management and/or generation of sensor data associated with a sensor (e.g., a pressure sensor). The sensor (e.g., the pressure sensor) can be associated with a wearable computing device (e.g., a "smart shoe" or another wearable computing device). In various embodiments described herein, the sensor data associated with the sensor (e.g., the pressure sensor) can be managed and/or generated based on surface type. For example, output (e.g., a sensor signal) of or generated by the sensor (e.g., the pressure sensor) can be adjusted based on a type of floor surface or a type of ground surface (e.g., determined hardness of a floor surface, determined hardness of a ground surface, etc.). In one example, the surface type can be determined based on pressure data associated with the sensor and/or user data for a user identity associated with the sensor. For example, the pressure data can be data corresponding to a pressure applied to a surface of the sensor and/or data generated by the sensor in response to the pressure applied to the surface of the sensor. Furthermore, the user data can include characteristic data, location data and/or other data associated with the wearable computing device and/or a user that employs the sensor. Additionally or alternatively, input data generated based on the output associated with the sensor and provided to a user interface of a device can be adjusted based on the surface type. For example, the device can be an electronic device in communication with the wearable computing device associated with the sensor. Furthermore, the sensor can be employed to generate input to control a set of functions associated with the electronic device and/or a user interface of the electronic device. Therefore, the input that controls the set of functions associated with the electronic device and/or the user interface can be adjusted (e.g., calibrated) based on the adjusted output of the sensor (e.g., the output of the sensor that is adjusted based on the surface type). Accordingly, accuracy and/or consistency of sensor data associated with a sensor (e.g., a pressure sensor) can be improved. Sensor data associated with a sensor (e.g., a pressure sensor) can also be balanced for various environments (e.g., various indoor environments and/or various outdoor environments). Moreover, a user experience for a user interface that receives input associated with a sensor (e.g., a pressure sensor) can be improved.

FIG. 1 illustrates an example, non-limiting embodiment of a method 100 to manage and/or generate data associated with a sensor (e.g., a pressure sensor). In an aspect, the method 100 can be associated with a sensor system (e.g., a pressure sensor system associated with wearable technology). The method 100 in FIG. 1 can be implemented using, for example, any of the systems, such as a system 200 (of FIG. 2), a system 300 (of FIG. 3), a system 400 (of FIG. 4), a system 500 (of FIG. 5), a system 600 (of FIG. 6), etc., described herein below. The method 100 may include one or more operations, functions or actions as illustrated by one or more of blocks 102, 104 and/or 106.

Beginning at block 102, output data generated by a pressure sensor is received. The pressure sensor can be a sensor (e.g., an embedded sensor) that measures pressure (e.g., a force) applied to a surface of the pressure sensor. For example, the pressure sensor can generate the output data based on first pressure data associated with a first surface of the pressure sensor and second pressure data associated with a second surface of the pressure sensor. In an implementation, the pressure sensor can be associated with a wearable device and/or a wearable consumer product. For example, the pressure sensor can be included in a shoe (e.g., a sole of "smart shoe"). Therefore, in one example, the pressure sensor can be an in-shoe pressure sensor. Additionally, at least one processor and/or other electronic device(s) can be embedded in the wearable device and/or the wearable consumer product with the pressure sensor. In certain implementations, the pressure sensor can be associated with a user and/or a user identity (e.g., an account, etc.). In one example, the output data can be generated based on an action performed by the user and/or the user identity. In another example, the output data can be generated in response to an instruction transmitted to a user interface to initiate the action performed by the user and/or the user identity. Block 102 may be followed by block 104.

At block 104, surface data is determined based on the output data. The surface data can be indicative of a surface type associated with a force applied to a surface of the pressure sensor. For example, the surface type can be a type of floor surface or a type of ground surface (e.g., an indoor surface, a carpet floor surface, a wood floor surface, a concrete floor surface, a tile floor surface, a padded floor surface, an outdoor surface, a paved surface, a concrete surface, a dirt surface, a grass surface, a gravel surface, another type of surface, etc.). Furthermore, the surface data can represent hardness or softness of the surface type. For example, the surface data can represent hardness or softness of the type of floor surface or the type of ground surface.

In an aspect, the output data can be compared to data stored in a data structure. For example, the output data can be compared to pressure data (e.g., pressure values), defined surface data (e.g., defined surface values) and/or user data (e.g., user characteristics) stored in a data structure. The data structure can be, for example, a data table stored in a memory (e.g., a memory associated with the pressure sensor and/or wearable device that includes the pressure sensor). Additionally or alternatively, the data structure can be stored in a remote data store (e.g., a server). The pressure data, the defined surface data and/or the user data can be predefined data stored in the data structure. For example, the output data can be classified as particular pressure data stored in the data structure (e.g., the output data can correspond to particular pressure data stored in the data structure). Furthermore, the particular pressure data stored in the data structure can correspond to particular surface data (e.g., a particular surface value) associated with a particular surface type. The pressure data (e.g., the pressure value) stored in the data structure can be previously generated pressure data. For example, the pressure data can be generated based on pressures measured using the pressure sensor or another pressure sensor similarly configured as the pressure sensor. In one example, the pressure data can be generated based on pressures measured during a research study and/or a testing process for the pressure sensor or another pressure sensor similarly configured as the pressure sensor. In another example, the pressure data can be generated based on pressures measured during a calibration mode associated with the pressure sensor or another pressure sensor similarly configured as the pressure sensor. In yet another example, the pressure data can be generated based on historical data associated with the pressure sensor (e.g., output data previously generated by the pressure sensor). Additionally or alternatively, the pressure data can be a range of output values (e.g., a list of output values) that can be generated by the pressure sensor.

The defined surface data (e.g., the defined surface values) can be associated with known types of floor surfaces and/or known types of ground surfaces. For example, a first type of floor surface (e.g., a carpet floor) can correspond to a first defined surface value, a second type of floor surface (e.g., a tile floor) can correspond to a second defined surface value, etc. In one example, the defined surface data can be generated during the research study and/or the testing process for the pressure sensor or the other pressure sensor similarly configured as the pressure sensor.

In certain implementations, user data that corresponds to predefined user characteristics, user characteristics associated with a user profile, user characteristics generated by another sensor (e.g., a gyroscope sensor, an accelerometer sensor, an image sensor, an audio sensor, etc.) and/or user characteristics received from a device (e.g., a device implemented separate from the sensor) can additionally be employed to match the output data to the particular pressure data and/or the particular surface data. For example, the particular surface data can be determined as a function of the particular pressure data and the user data. In an aspect, particular pressure data in the data structure can be associated with a group of data associated with the defined surface data and the user data. For example, during the research study, the testing process and/or the calibration mode, it can be determined how particular pressure data associated with the pressure sensor varies based on a type of floor surface, a type of ground surface and/or the user data (e.g., weight of a user, posture of a user, etc.). Then, particular defined surface data and/or particular user data generated during the research study, the testing process and/or the calibration mode can be stored in the data structure (e.g., in connection with the particular pressure data associated with the pressure sensor). In a non-limiting example, first pressure data (e.g., a particular pressure value) and first user data (e.g., a particular weight value for a user) can correspond to first surface data (e.g., a particular type of floor surface or a particular type of ground surface), first pressure data (e.g., the particular pressure value) and second user data (e.g., another weight value for a user) can correspond to second surface data (e.g., another type of floor surface or a another type of ground surface), etc. Block 104 may be followed by block 106.

At block 106, the output data is adjusted based on the surface data to facilitate generating adjusted output data indicative of an adjusted pressure value generated by the pressure sensor. For example, the output data can be modified (e.g., calibrated) based on the type of floor surface or the type of ground surface. In one example, an analog data value associated with the output data can be increased or decreased by a defined amount based on the surface data. In another example, a digital data value associated with the output data can be changed to a different digital data value based on the surface data.

In an aspect, the output data of the pressure sensor can be adjusted by normalizing the output data based on the surface data. For example, the output data can be modified based on a normalized value associated with the surface data. In a non-limiting example, particular output data equal to 1.0 can be generated by the pressure sensor. Furthermore, particular surface data can be determined that indicates that the particular output data was generated via a carpet surface, where a normalized value of a carpet surface is equal to 1.2 (e.g., to compensate for softness of the carpet surface). Therefore, the particular output data equal to 1.0 can be multiplied by the normalized value equal to 1.2, thereby adjusting the output data to adjusted output data equal to 1.2.

In another aspect, the output data of the pressure sensor can be adjusted by adding the surface data to the output data (or by subtracting the surface data from the output data). For example, the output data can be calibrated by a defined amount based on the surface data. In a non-limiting example, particular output data equal to 1.0 can be generated by the pressure sensor. Furthermore, particular surface data can be determined that indicates that the particular output data was generated via a particular surface, where the particular surface data is equal to 0.3. Therefore, the surface data equal to 0.3 can be added to the particular output data equal to 1.0 in response to a determination that the surface data is associated with a soft surface type, thereby adjusting output data to adjusted output data equal to 1.3. Alternatively, the surface data equal to 0.3 can be subtracted from the particular output data equal to 1.0 in response to a determination that the surface data is associated with a hard surface type, thereby adjusting output data to adjusted output data equal to 0.7.

In yet another aspect, the output data of the pressure sensor can be adjusted by changing a digital bit value associated with the output data based on the surface data. For example, a bit value associated with the output data can be changed to another bit value based on the surface data. In a non-limiting example, particular output data equal to a bit value of 0010 can be generated by the pressure sensor. Furthermore, particular surface data can be determined that indicates that the particular output data was generated via a particular soft surface. Therefore, the bit value for the particular output data can be changed to another bit value (e.g., another bit value equal to 0011) in response to a determination that the surface data is associated with a soft surface type. Alternatively, particular surface data can be determined that indicates that the particular output data was generated via a particular hard surface. Therefore, the bit value for the particular output data can be changed to another bit value (e.g., another bit value equal to 0001) in response to a determination that the surface data is associated with a hard surface type. However, it is to be appreciated that one or more other techniques can additionally or alternatively be employed to adjust the output data based on the surface data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
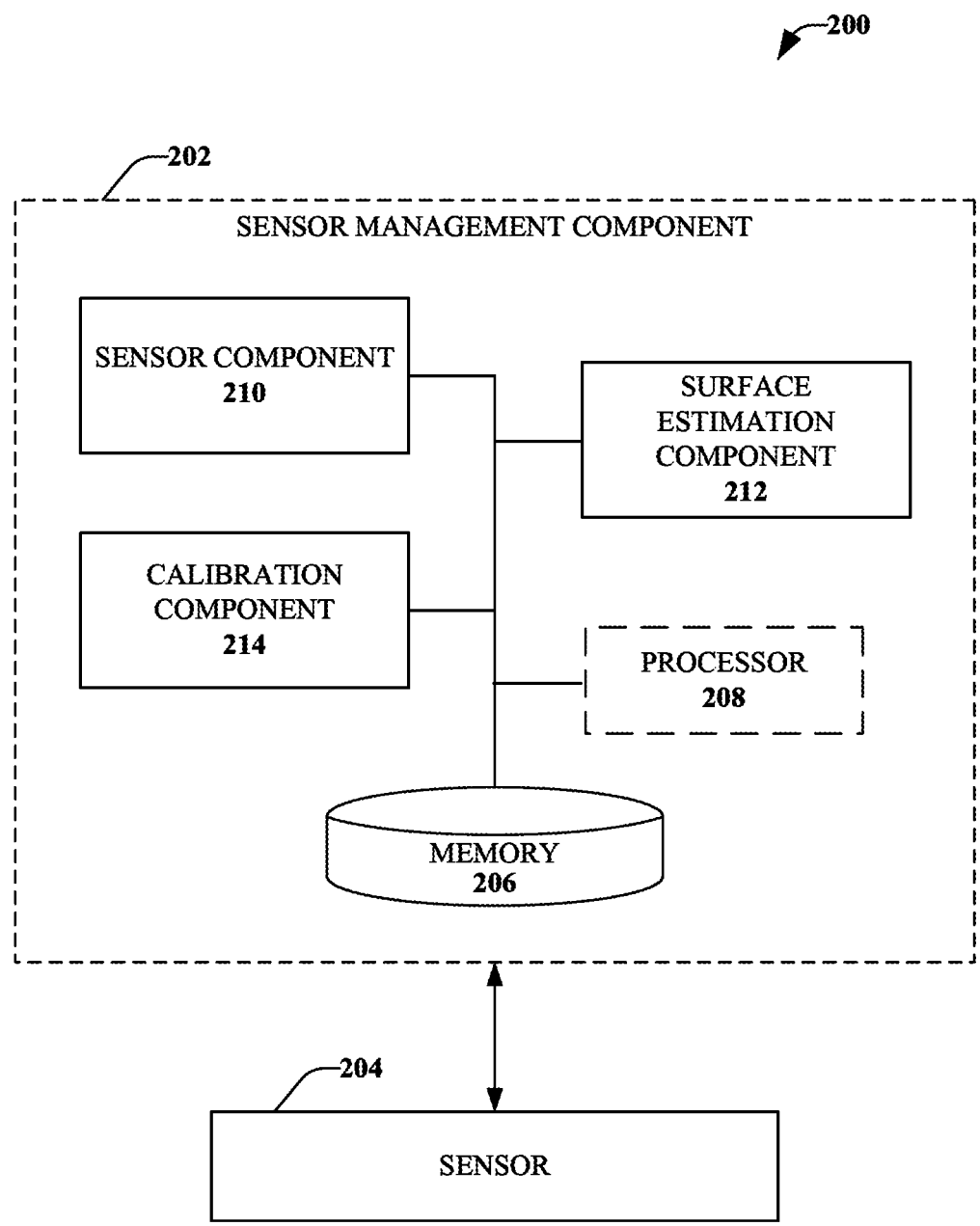
FIG. 2 illustrates an example, non-limiting embodiment of a system to manage and/or generate sensor data.

Turning now to FIG. 2, illustrated is an example, non-limiting embodiment of the system 200 to manage and/or generate data associated with a sensor (e.g., a pressure sensor). The system 200 can be associated with an application, such as but not limited to, a gaming application, a multimedia application, a user interface application, a controller application, a user input application, a data collection application, a television remote application, an authentication application, a security application, a medical application, a biometric data collection application, an athletic application, a pressure sensing application, another type of application, etc. In one example, the system 200 can be associated with a sensor system (e.g., a pressure sensor system associated with wearable technology).

The system 200 can include a sensor management component 202 and a sensor 204. The sensor management component 202 can include at least one memory 206 that can store computer-executable components and instructions. The sensor management component 202 can also include at least one processor 208, communicatively coupled to the at least one memory 206. Coupling can include various communications including, but not limited to, direct communications, indirect communications, wired communications, and/or wireless communications. The at least one processor 208 can be operable to execute or facilitate execution of one or more of the computer-executable components stored in the memory 206. The processor 208 can be directly involved in the execution of the computer-executable component(s), according to an aspect. Additionally or alternatively, the processor 208 can be indirectly involved in the execution of the computer executable component(s). For example, the processor 208 can direct one or more components to perform the operations.

It is noted that although one or more computer-executable components can be described herein and illustrated as components separate from the memory 206 (e.g., operatively connected to memory), in accordance with various embodiments, the one or more computer-executable components might be stored in the memory 206. Further, while various components have been illustrated as separate components, it will be appreciated that multiple components can be implemented as a single component, or a single component can be implemented as multiple components, without departing from example embodiments.

The sensor management component 202 can also include a sensor component 210, a surface estimation component 212 and/or a calibration component 214. In one example, the system 200 can be included in a wearable device (e.g., a wearable computing device, a wearable computer, etc.). For example, the system 200 can be included in a consumer product (e.g., the system 200 can be included in wearable technology, the system 200 can be included in a sole of a shoe, etc.). In another example, the sensor 204 can be included in a wearable device (e.g., a wearable computing device, a wearable computer, etc.) and the sensor management component 202 can be included in another device (e.g., a mobile phone or another electronic device in communication with the sensor 204). The sensor component 210 can receive output data generated by the sensor 204. The sensor 204 can be, for example, a pressure sensor (e.g., an embedded pressure sensor). For example, the output data can be generated based on first pressure data associated with a first surface of the sensor 204 and/or second pressure data associated with a second surface of the sensor 204. In one example, the first surface of the sensor 204 can be associated with a surface and the second surface of the sensor 204 can be associated with a user (e.g., a foot of a user). Therefore, the output data can be associated with a plantar pressure (e.g., a measured plantar pressure). Additionally or alternatively, the sensor component 210 can receive other data associated with the sensor 204. For example, the sensor component 210 can receive input data (e.g., the first pressure data and/or the second pressure data) employed to generate the output data.

The surface estimation component 212 can determine surface data based on the output data. The surface data can be indicative of a type of floor surface or a type of ground surface (e.g., a surface type) employed to generate the output data. For example, the surface data can be indicative of an indoor surface, a carpet floor surface, a wood floor surface, a concrete floor surface, a tile floor surface, a padded floor surface, an outdoor surface, a paved surface, a concrete surface, a dirt surface, a grass surface, a gravel surface, another type of surface, etc. Furthermore, the surface data can represent hardness or softness of the type of floor surface or the type of ground surface. Therefore, the surface estimation component 212 can estimate a type of floor surface or a type of ground surface by monitoring output of the sensor 204. In one example, the surface data can be indicative of a type of floor surface or a type of ground surface (e.g., a surface type) employed to generate the first pressure data. As such, the surface data can be indicative of a type of surface associated with a pressure applied to the sensor 204. In another example, the surface data can correspond to pressure value.

In an aspect, the surface estimation component 212 can compare the output data to defined surface data indicative of defined types of floor surfaces and/or defined types of ground surfaces. For example, the surface estimation component 212 can compare the output data (e.g., measured pressure) with a data structure (e.g., a data table that includes the defined types of floor surfaces) to determine a surface type. In one example, first defined surface data included in the data structure can represent a first type of surface, second defined surface data included in the data structure can represent a second type of surface, third defined surface data included in the data structure can represent a third type of surface, etc. The data structure can be stored in a memory, such as the memory 206 or another memory associated with the sensor management component 202. In an implementation, the data structure can alternatively be stored in a remote database. Therefore, data included in the data structure can be received by the sensor management component 202 via a network (e.g., via one or more network device, via one or more wireless communication channels and/or via one or more wired communication channels).

The data structure can include pressure data (e.g., pressure values), defined surface data (e.g., defined surface values) and/or defined user data (e.g., defined user characteristics). The pressure data (e.g., the pressure value) stored in the data structure can be previously generated pressure data. For example, the pressure data can be generated based on pressures measured using the sensor 204 or another sensor similarly configured as the sensor 204. In one example, the pressure data can be generated based on pressures measured during a research study and/or a testing process for the sensor 204 or another pressure sensor similarly configured as the sensor 204. In another example, the pressure data can be generated based on pressures measured during a calibration mode associated with the sensor 204 or another sensor similarly configured as the sensor 204. In yet another example, the pressure data can be generated based on historical data associated with the sensor 204 (e.g., output data previously generated by the sensor 204). Additionally or alternatively, the pressure data can be a range of output values (e.g., a list of output values) that can be generated by the sensor 204.

The defined surface data (e.g., the defined surface values) can be associated with known types of floor surfaces and/or known types of ground surfaces. For example, a first type of floor surface (e.g., a carpet floor) can correspond to a first defined surface value, a second type of floor surface (e.g., a tile floor) can correspond to a second defined surface value, etc. In one example, the defined surface data can be generated during the research study and/or the testing process for the sensor 204 or the other pressure sensor similarly configured as the sensor 204. The defined user data can be associated with predefined user characteristics, such as, for example, a set of possible weights for a user, a set of possible postures for a user, other characteristics associated with a user, etc. In an aspect, particular pressure data in the data structure can be associated with a set of data associated with the defined surface data and the defined user data. For example, during the research study, the testing process and/or the calibration mode, it can be determined how particular pressure data associated with the pressure sensor varies based on a type of floor surface, a type of ground surface and/or the defined user data (e.g., weight of a user, posture of a user, etc.). Then, particular defined surface data and/or particular defined user data generated during the research study, the testing process and/or the calibration mode can be stored in the data structure (e.g., in connection with the particular pressure data associated with the pressure sensor).

The surface estimation component 212 can determine that the output data corresponds to particular defined surface data if the output data matches the particular defined surface data. For example, the output data can correspond to the first defined surface data in response to a determination (e.g., by the surface estimation component 212) that output data is approximately equal to or exactly matches the particular defined surface data. In another example, the output data can correspond to the first defined surface data in response to a determination (e.g., by the surface estimation component 212) that output data satisfies a first threshold value and/or a second threshold value associated with the particular defined surface data (e.g., the output data is within a defined margin associated with the particular defined surface data). In certain implementations, the output data can correspond to the first defined surface data in response to a determination (e.g., by the surface estimation component 212) that output data is approximately equal to or exactly matches particular defined pressure data associated with the particular defined surface data. For example, defined pressure data can also be stored in the data structure and/or can be linked to the defined surface data (e.g., first defined pressure data can correspond to first defined surface data, second defined pressure data can correspond to second defined surface data, etc.). In another implementation, the output data can correspond to the first defined surface data in response to a determination (e.g., by the surface estimation component 212) that output data satisfies a first threshold value and/or a second threshold value associated with the particular defined pressure data (e.g., the output data is within a defined margin associated with the particular defined pressure data).

The calibration component 214 can calibrate the output data generated by the sensor 204 based on the surface data to generate calibrated output data indicative of a calibrated pressure value generated by sensor 204. In one example, the calibration component 214 can normalize the output data based on the surface data. For example, the calibration component 214 can apply a weighted value associated with the surface data to the output data. In a non-limiting example, particular output data equal to 1.0 can be generated by the sensor 204. Furthermore, particular surface data can be determined that indicates that the particular output data was generated via a hard wood surface, where a normalized value of a hard wood surface is equal to 0.8 (e.g., to compensate for hardness of the hard wood surface). Therefore, the particular output data equal to 1.0 can be multiplied by the normalized value equal to 0.8, thereby adjusting the output data to calibrated output data equal to 0.8. In another example, the calibration component 214 can modify the output data based on a difference between the output data and the surface data. In another example, the calibration component 214 can adjust the output data by adding the surface data to the output data (or by subtracting the surface data from the output data). For example, the output data can be calibrated by a defined amount based on the surface data. In a non-limiting example, particular output data equal to 1.0 can be generated by the sensor 204. Furthermore, particular surface data can be determined that indicates that the particular output data was generated via a particular surface, where the particular surface data is equal to 0.1. Therefore, the surface data equal to 0.1 can be added to the particular output data equal to 1.0 in response to a determination that the surface data is associated with a soft surface type, thereby adjusting output data to adjusted output data equal to 1.1. Alternatively, the surface data equal to 0.1 can be subtracted from the particular output data equal to 1.0 in response to a determination that the surface data is associated with a hard surface type, thereby adjusting output data to adjusted output data equal to 0.9. However, it is to be appreciated that the calibration component 214 can additionally or alternatively employ one or more other calibration techniques to calibrate the output data based on the surface data.

In certain implementations, the sensor component 210 can additionally receive user data indicative of characteristic information for a user identity associated with a wearable device that comprises the sensor 204. For example, the sensor component 210 can receive the user data from a memory (e.g., the memory 206 and/or another memory associated with the sensor management component 202) and/or another device (e.g., a device that includes another sensor, a server, etc.). The characteristic information can include a weight of a user associated with the user identity, a posture of a user associated with the user identity, other characteristic information associated with a user identity, etc. For example, weight data can also be received in addition to the output data generated by the sensor 204 (e.g., the weight data can be indicative of weight information for a user associated with the user identity). Furthermore, the surface estimation component 212 can determine the surface data based on the output data and the user data (e.g., the weight data, etc.). For example, the data structure (e.g., the data table that includes the defined types of floor surfaces) can additionally include user data (e.g., weight data) to facilitate determination of the surface data. In other implementations, the output data can be pre-processed with the user data (e.g., the weight data, etc.). For example, the output data can be pre-processed to take into consideration a weight of a user, a posture of a user, other characteristic information regarding a user identity, etc. For example, the output data can be normalized (e.g., before determining the surface data) based on a normalized value associated with weight of a user. The weight of the user can be associated with a user profile and/or can be stored in a memory (e.g., the memory 206) or a remote database. Additionally or alternatively, the weight of the user can be determined (e.g., before determining the surface data) based on data associated another sensor (e.g., a weight pressure sensor, etc.). In another example, the output data can be normalized based on a normalized value associated with posture of a user. The posture of the user (e.g., posture data) can be determined based on data associated with at least one other sensor (e.g., another pressure sensor, a gyroscope sensor, an accelerometer sensor, an image sensor, an audio sensor, another type of sensor, etc.). Then, the output data can be normalized based on the determined posture of the user (e.g., the posture data). As such, output (e.g., an output signal) generated by the sensor 204 can be modified to account for a user associated with the sensor 204 (e.g., a wearer of a shoe that includes the sensor 204) and the surface data (e.g., hardness or softness of a surface associated with the shoe that includes the sensor 204).

In an implementation, various aspects of the surface estimation component 212 (e.g., in connection with determining the surface data) may employ various artificial intelligence-based schemes for carrying out various aspects thereof. For example, a process for determining the surface data may be enabled through an automatic classifier system and/or process. A classifier is a function that maps an input attribute vector, x=(x1, x2, x3, x4, xn), to a confidence that the input belongs to a class, that is, f(x)=confidence(class). Such classification may employ a probabilistic and/or statistical-based analysis to prognose or infer a result. A support vector machine (SVM) is an example of a classifier that may be employed. The SVM operates by finding a hypersurface in the space of possible inputs, which hypersurface attempts to split the triggering criteria from the non-triggering events. Other directed and undirected model classification approaches include, for example, naïve Bayes, Bayesian networks, decision trees, neural networks, fuzzy logic models, and probabilistic classification models providing different patterns of independence may be employed. Classification as used herein also is inclusive of statistical regression that is utilized to develop models of priority. The one or more aspects may employ classifiers that are explicitly trained (e.g., through a generic training data) as well as implicitly trained (e.g., by observing user behavior, receiving extrinsic information, employing historical data, etc.). For example, SVM's are configured through a learning or training phase within a classifier constructor and feature selection module. Thus, the classifier(s) may be used to learn and perform a number of functions as described herein.

Figure 3:
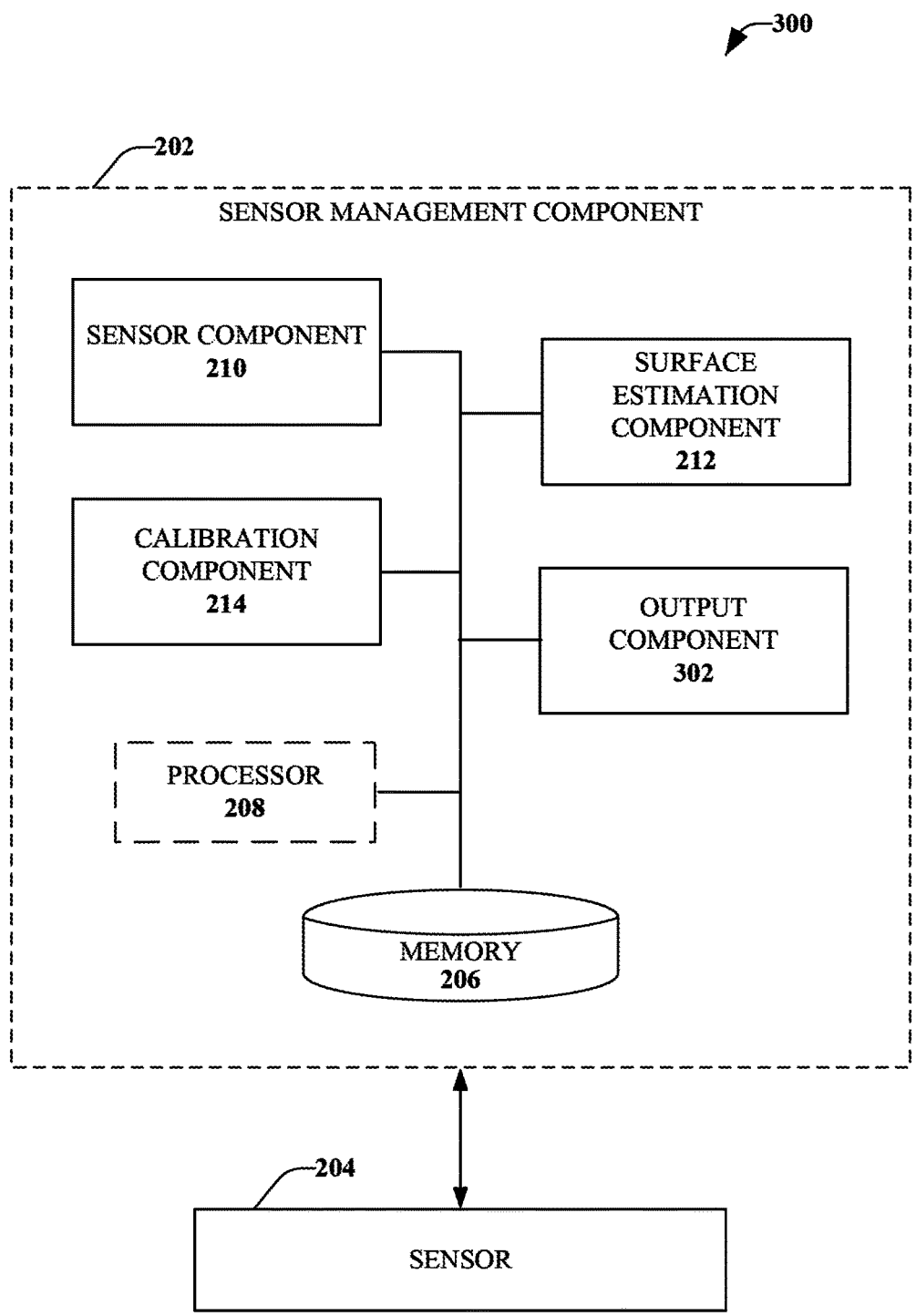
FIG. 3 illustrates an example, non-limiting embodiment of another system to manage and/or generate sensor data.

FIG. 3 illustrates an example, non-limiting embodiment of the system 300 to manage and/or generate data associated with a sensor (e.g., a pressure sensor). In one example, the system 300 can be associated with a sensor system (e.g., a pressure sensor system associated with wearable technology). The system 300 can include the sensor management component 202 and the sensor 204. The sensor management component 202 can include the memory 206, the processor 208, the sensor component 210, the surface estimation component 212, the calibration component 214 and/or an output component 302.

The output component 302 can output the calibrated output data for the sensor 204. For example, the output component 302 can transmit the calibrated output data to a device in communication with the sensor management component 202. Additionally or alternatively, the output component 302 can update data provided to a user interface and/or an electronic device based on the calibrated output data. For example, the output component 302 can modify input data provided to a user interface and/or an electronic device based on the calibrated output data. Therefore, the output component 302 can modify data provided to a user interface and/or an electronic device based on a type of floor surface or a type of ground surface. Additionally or alternatively, the output component 302 can modify a user interface based on the calibrated output data. For example, the output component 302 can provide a different user interface based on the calibrated data. In one example, first data can be presented on a user interface in response to a determination that the calibrated output data is associated with a first type of floor surface or a first type of ground surface, second data can be presented on a user interface in response to a determination that the calibrated output data is associated with a second type of floor surface or a second type of ground surface, etc.

In a non-limiting example, the system 300 can be associated with a multimedia system (e.g., a television system) where volume of an electronic device (e.g., a television) is controlled based on the sensor 204. The calibrated output data provided by the output component 302 can provide control of volume for the electronic device (e.g., the television). For example, when the calibrated output data is associated with a certain output value, the volume for the electronic device (e.g., the television) can be increased at a certain speed (e.g., increased rapidly). Furthermore, when the calibrated output data is associated with another output value, the volume for the electronic device (e.g., the television) can be decreased at a certain speed (e.g., decreased slowly). Additionally or alternatively, the calibrated output data provided by the output component 302 can be employed as input to the electronic device (e.g., the television). For example, if the calibrated output data is associated with a certain output value (e.g., 70% of a maximum pressure level), then the volume for the electronic device (e.g., the television) can be set to a volume level corresponding to the certain output value (e.g., the volume can be set to 70% of a maximum volume level).

In another non-limiting example, the system 300 can be associated with a gaming system (e.g., a gaming console) where a user interacts with the gaming system. Therefore, the output component 302 can determine a number of actions (e.g., number of steps, number of jumps, number of foot movements, etc.) performed during a defined time period based on the surface data and/or the calibrated output data. For example, a determined number of actions (e.g., determined number of steps, determined number of jumps, determined number of foot movements, etc.) performed during the defined time period can be modified based on the surface data and/or the calibrated output data. A certain surface data value (e.g., a harder surface) can, for example, correspond to a lower number of actions (e.g., a lower number of steps, a lower number of jumps, a lower number of foot movements, etc.). In another example, a distance associated with a set of actions (e.g., a distance of foot movements) during a defined time period can be modified based on the surface data and/or the calibrated output data. For example, a certain surface data value (e.g., a harder surface) can generate more input data associated with a first type (e.g., an "up arrow" button input to a "right arrow" button input) than other input data associated with a second type (e.g., a "left arrow" button input to a "right arrow" button input). Therefore, a set of actions with respect to the sensor 204 (e.g., a set of actions for a user) can be managed. Moreover, fatigue of a user associated with the sensor 204 can be managed.

In an implementation where a first user interacts with the gaming system in a first location associated with a first surface type, and a second user interacts with the gaming system in a second location associated with a second surface type, the output component 302 can modify first user input (e.g., first user input associated with the first user) provided to the gaming system based on the first surface type. Furthermore, the output component 302 can modify second user input (e.g., second user input associated with the second user) provided to the gaming system based on the second surface type. Therefore, the first user and the second user can provide the gaming system normalized input data (e.g., the first user and the second user can be provided an equal advantage) for a game associated with the gaming system.

Additionally or alternatively, the output component 302 can generate a set of events based on the calibrated output data and/or the input data determined based on the calibrated output data. In an aspect, the output component 302 can generate authentication data, indicative of a password for a user identity associated with a wearable device that comprises the sensor 204 and/or the system 300, based on the calibrated output data. In another aspect, the output component 302 can generate biometric data, indicative of biometric information for a user identity associated with a wearable device that comprises the sensor 204 and/or the system 300, based on the calibrated output data.

Figure 4:
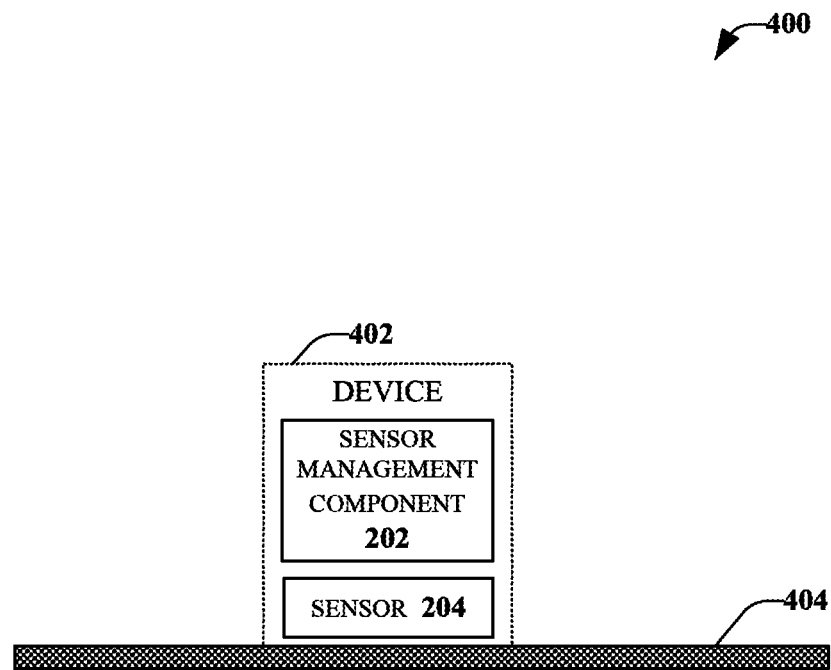
FIG. 4 illustrates an example, non-limiting embodiment of a system that includes a device to manage and/or generate sensor data based on a surface type.

Turning now to FIG. 4, illustrated is an example, non-limiting embodiment of the system 400 to manage and/or generate data associated with a sensor (e.g., a pressure sensor). The system 400 can include a device 402. The device 402 can be associated with a user identity (e.g., a profile, an account, etc.). In one example, the device 402 can be associated with or can be included in a wearable device (e.g., a wearable computing device, a wearable computer, etc.). For example, the device 402 can be associated with or can be included in a smart shoe (e.g., the device 402 can be embodied within a sole of a shoe, for example). Accordingly, a user associated with the user identity can utilize and/or wear the device 402.

The device 402 can include at least the sensor management component 202 and the sensor 204. For example, the sensor management component 202 can include the memory 206, the processor 208, the sensor component 210, the surface estimation component 212, the calibration component 214 and/or the output component 302. In an aspect, the sensor 204 can determine a pressure (e.g., a force) applied to the sensor 204 (e.g., the first pressure data) via a surface 404. The surface 404 can be a floor surface in an indoor environment or a ground surface in an outdoor environment. For example, the surface 404 can be an indoor surface, a carpet floor surface, a wood floor surface, a concrete floor surface, a tile floor surface, a padded floor surface, an outdoor surface, a paved surface, a concrete surface, a dirt surface, a grass surface, a gravel surface, another type of surface, etc. As plantar pressures are affected by the surface 404, a user action associated with a first surface type of the surface 404 can result in a different pressure than the same user action associated with a second surface type of the surface 404. To provide consistent sensor data associated with the sensor 204, the output data of the sensor 204 can be modified (e.g., via the sensor management component 202) based on a surface type of the surface 404, as more fully disclosed herein.

Figure 5:
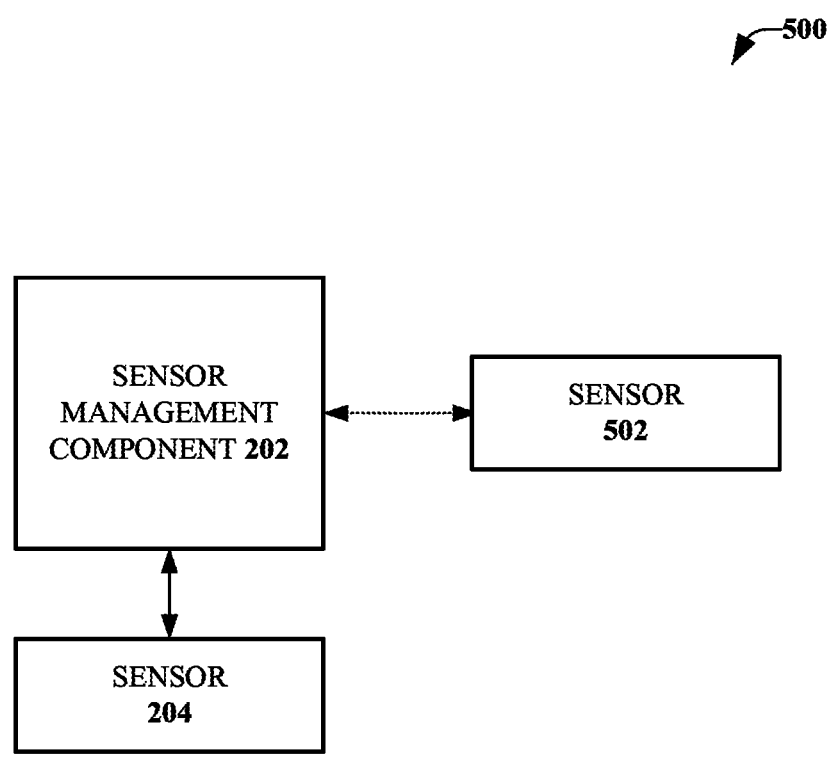
FIG. 5 illustrates an example, non-limiting embodiment of a system that includes multiple sensors to manage and/or generate sensor data.

Turning now to FIG. 5, illustrated is an example, non-limiting embodiment of the system 500 to manage and/or generate data associated with a sensor (e.g., a pressure sensor). The system 500 can include the sensor management component 202, the sensor 204 and a sensor 502. In an example, the sensor management component 202 and the sensor 204 can be implemented in the device 402, and the sensor 502 can be implemented in another device. The sensor management component 202 can include the memory 206, the processor 208, the sensor component 210, the surface estimation component 212, the calibration component 214 and/or the output component 302.

In an aspect, the sensor 204 can be a pressure sensor. The sensor 502 can be another sensor, such as, for example, another pressure sensor (e.g., a weight sensor), a gyroscope sensor, an accelerometer sensor, an image sensor (e.g., a camera sensor, etc.), an audio sensor (e.g., a microphone sensor, etc.), a motion sensor, another type of sensor, etc. As such, the sensor 502 can collect other sensor data, orientation data, acceleration data, visual data, audio data, motion data, input data, location data and/or other sensor data. In one example, the sensor 502 can facilitate a determination of a set of actions performed by an user identity associated with the sensor management component 202. The sensor 502 can be in communication with the sensor management component 202 and/or the sensor 204. For example, the sensor 502 can communicate with the sensor management component 202 and/or the sensor 204 via one or more wireless communication channels and/or one or more wired communication channels. In an aspect, the sensor management component 202 (e.g., the sensor component 210) can receive other output data generated by the sensor 502. As such, the surface estimation component 212 can determine surface data based on the output data associated with the sensor 204 and/or the other output data associated with the sensor 502. Furthermore, the calibration component 214 can calibrate the output data based on the surface data determined as a function of the output data associated with the sensor 204 and/or the other output data associated with the sensor 502. However, it is to be appreciated that the system 500 can also include other sensor(s) (e.g., a third sensor, a fourth sensor, etc.). Therefore, the surface estimation component 212 can additionally determine surface data based on data associated with other sensor(s) (e.g., a third sensor, a fourth sensor, etc.).

The sensor management component 202 (e.g., the sensor component 210) can also request that a certain action be performed by a user identity via the sensor 502. For example, the sensor management component 202 (e.g., the sensor component 210) can request that a certain action be performed to facilitate generation of the output data generated by the sensor 204. The sensor management component 202 can generate the request in response to a determination that additional information is needed to determine the surface data. In another aspect, the sensor 502 can be associated with user data. For example, the sensor data can facilitate generation of posture data for a user. In one example, output data generated by the sensor 502 can be ignored in response to a determination that the other output data generated by the sensor 502 satisfies a defined criterion (e.g., ignore the output data of the sensor 204 when a user is sitting in a chair, etc.).

In a non-liming example associated with a gaming system (e.g., a gaming console) where a user interacts with the system (e.g., a gaming system, a multimedia system, etc.), the sensor management component 202 can determine a ratio of actions (e.g., a ratio of foot related actions) within a defined time period based on the surface type. In one example, the sensor management component 202 can request additional actions related to the sensor 204 (e.g., request additional foot related actions) when the surface data is associated with a particular surface data value (e.g., a soft surface), and request additional actions related to the sensor 502 (e.g., request additional hand related actions for performing a function) when the surface data is associated with another particular surface data value (e.g., a hard surface).

In another non-limiting example where the system 500 is associated with a gaming system (e.g., a gaming console) and a user interacts with the gaming system, the sensor management component 202 (e.g., the sensor component 210) can request that the user "jump to start the game" or "stamp a foot to select game". Therefore, the sensor 502 can be employed to measure how high the player jumped or how hard the player stamped. As such, other output data generated by the sensor 502 in response to the request can be employed to generate the surface data and/or the calibrated output data.

Figure 6:
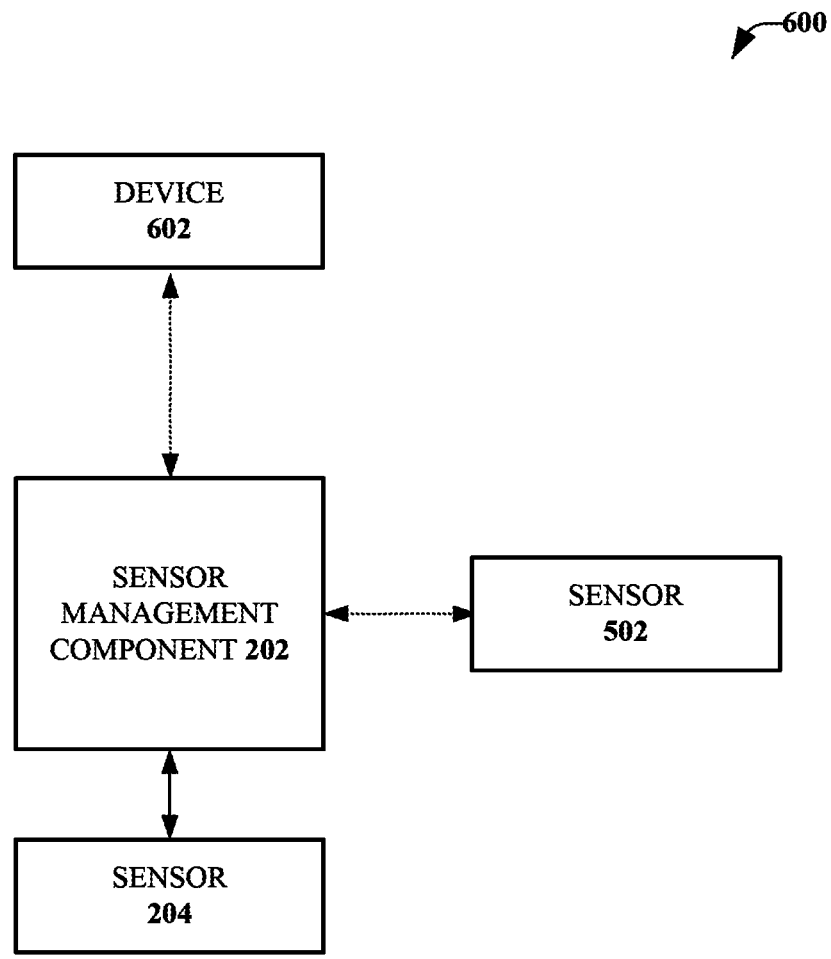
FIG. 6 illustrates an example, non-limiting embodiment of a system that includes a device that receives data managed and/or generated by a sensor management component.

FIG. 6 illustrates an example, non-limiting embodiment of the system 600 to manage and/or generate data associated with a sensor (e.g., a pressure sensor). The system 600 can include the sensor management component 202, the sensor 204, the sensor 502 and a device 602. The device 602 can be in communication with the sensor management component 202, the sensor 204 and/or the sensor 502. For example, the device 602 can communicate with the sensor management component 202, the sensor 204 and/or the sensor 502 via one or more wireless networks and/or one or more wired networks. The sensor management component 202 can include the memory 206, the processor 208, the sensor component 210, the surface estimation component 212, the calibration component 214 and/or the output component 302. The sensor management component 202 and the sensor 204 can be implemented in the device 402, and the sensor 502 can be implemented in another device. In one example, the sensor 502 can be implemented separate from the device 602 (e.g., the sensor 502 can be implemented in a device that is different than the device 602). In another example, the sensor 502 can be included in the device 602. However, in another example, the system 600 can be implemented without the sensor 502. The device 602 can be an electronic device, such as but not limited to, a mobile device (e.g., a smartphone), a wearable computing device (e.g., a smartwatch, smart glasses), a tablet, a handheld device, a gaming device (e.g., a gaming console), a television, an interactive television, an internet-connected television, a set-top box, a streaming media device, a computer, a laptop computer, a personal digital assistant (PDA), an electronic reader (e-reader), a portable computing device, a media capable device, another type of electronic device, etc.

The sensor management component 202 can receive data from the device 602. In an aspect, data received from the device 602 can be varied based on the surface data. For example, an amount of data received from the device 602 can be increased or decreased based on the surface data. The sensor management component 202 can also provide data to the device 602. In an aspect, data provided to the device 602 can be managed based on the surface data. For example, user inputs and/or user controls generated based on the sensor 204, and provided to the device 602, can be managed based on the calibrated output data. In one example, the sensor 204 and the calibrated output data can be employed to control volume functionality, fast forward functionality, rewind functionality and/or other inputs provided to the device 602. In another example, the sensor 204 and the calibrated output data can be employed to generate biometric data provided to the device 602. Therefore, accuracy of the biometric data obtained based on the sensor 204, and provided to the device 602, can be improved.

In an embodiment, the sensor management component 202 can be included in the device 602 or another electronic device. For example, the sensor 204 can be included in a wearable device (e.g., a "smart shoe"). The sensor 204 can transmit output data (e.g., raw data generated by the sensor 204) to the sensor management component 202 included in the device 602 or the other electronic device via one or more wireless networks and/or one or more wireless communications protocols. Then, the sensor management component 202 included in the device 602 or the other electronic device can modify the output data associated with the sensor 204, as more fully disclosed herein.

Figure 7:
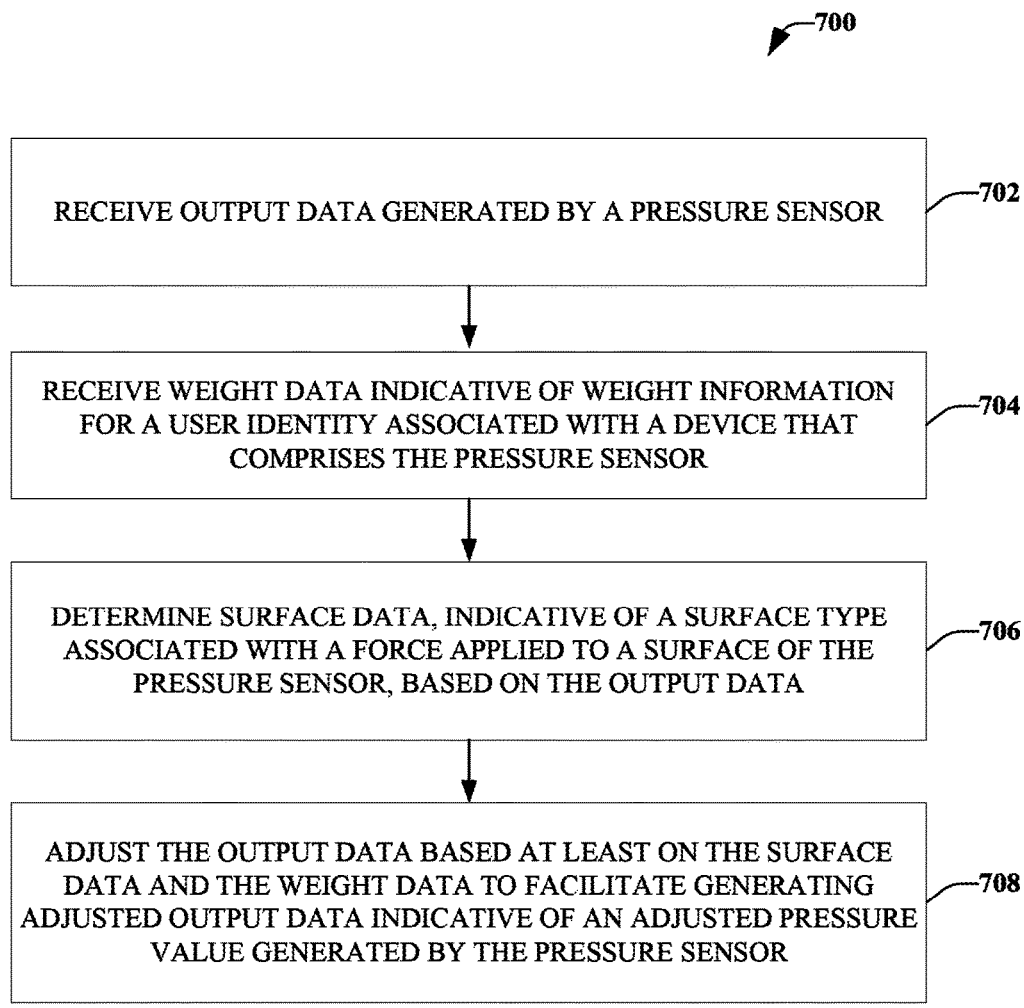
FIGS. 7-10 illustrate example, non-limiting embodiments of methods to manage and/or generate sensor data.

FIG. 7 is a flow diagram illustrating an example, non-limiting embodiment of a method 700 to manage and/or generate sensor data. In an aspect, the method 700 can be associated with a sensor system. The method 700 in FIG. 7 can be implemented using, for example, any of the systems, such as the system 200 (of FIG. 2), the system 300 (of FIG. 3), the system 400 (of FIG. 4), the system 500 (of FIG. 5), the system 600 (of FIG. 6), etc., described herein. The method 700 may include one or more operations, functions or actions as illustrated by one or more of blocks 702, 704, 706 and/or 708. In one embodiment, the method 700 can be associated with a wearable device (e.g., a smart shoe).

Beginning at block 702, output data generated by a pressure sensor is received. Block 702 may be followed by block 704. At block 704, weight data, indicative of weight information for a user identity associated with a device that comprises the pressure sensor, is received. In an aspect, the output data can be generated based on first pressure data associated with a first surface of the pressure sensor and/or second pressure data associated with a second surface of the pressure sensor. Furthermore, the weight data can be received from another sensor and/or another device. Additionally or alternatively, the weight data can be stored in a memory (e.g., provided by a user identity and/or a user account associated with user identity). Additionally or alternatively, the weight data can be received from a remote database (e.g., a server database). Block 704 may be followed by block 706. At block 706, surface data, indicative of a surface type associated with a force applied to a surface of the pressure sensor, is determined based on the output data. Block 706 may be followed by block 708.

At block 708, the output data is adjusted based at least on the surface data and the weight data to facilitate generating adjusted output data indicative of an adjusted pressure value generated by the pressure sensor. For example, the output data can be modified based on the weight data as well as the type of floor surface or the type of ground surface. In an aspect, the output data can be adjusted by normalizing the output data based on the surface data and the weight data. For example, the output data can be modified based on a normalized value associated with the surface data and the weight data. In another aspect, the output data can be adjusted by calculating a difference between the output data and data generated based on the surface data and the weight data. For example, the output data can be modified based on the difference between the output data and data generated based on the surface data and the weight data. In yet another aspect, the output data can be modified by adding a data value associated with the surface data and/or a data value associated with the weight data to the output data (or by subtracting a data value associated with the surface data and/or a data value associated with the weight data from the output data). For example, the output data can be calibrated by a defined amount based on the surface data and the weight data. In an implementation, the surface data can additionally be determined based on the weight data. For example, the surface data can be selected from the defined surface stored in the data structure based on the output data and the weight data. It is to be appreciated that other biometric data indicative of other characteristic information of the user identity can additionally or alternatively be received at block 704. Furthermore, other user data associated with the user identity (e.g., location data, information associated with a wearable device that includes the pressure sensor, etc.) can additionally or alternatively be received at block 704. Therefore, at block 708, the output data can additionally or alternatively be adjusted based on the other biometric data and/or the other user data.

Figure 8:
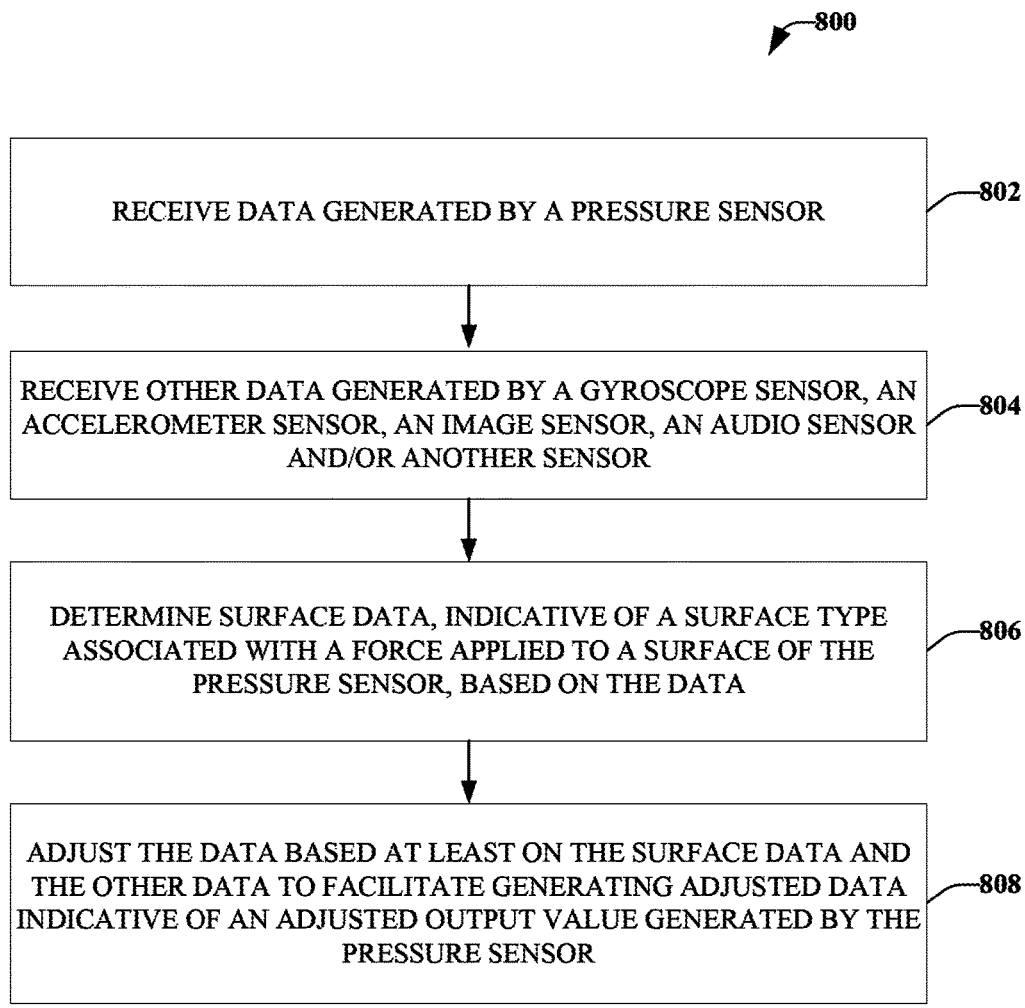

FIG. 8 is a flow diagram illustrating an example, non-limiting embodiment of a method 800 to manage and/or generate sensor data. In an aspect, the method 800 can be associated with a sensor system. The method 800 in FIG. 8 can be implemented using, for example, any of the systems, such as the system 200 (of FIG. 2), the system 300 (of FIG. 3), the system 400 (of FIG. 4), the system 500 (of FIG. 5), the system 600 (of FIG. 6), etc., described herein. The method 800 may include one or more operations, functions or actions as illustrated by one or more of blocks 802, 804, 806 and/or 808. In one embodiment, the method 800 can be associated with a wearable device (e.g., a smart shoe).

Beginning at block 802, data generated by a pressure sensor is received. The data can be, for example, output data generated by the pressure sensor. Block 802 may be followed by block 804. At block 804, other data generated by a gyroscope sensor, an accelerometer sensor, an image sensor, an audio sensor and/or another sensor is received. For example, the other data can include other output data, orientation data, acceleration data, image data (e.g., camera data), audio data (e.g., microphone data), other sensor data, etc. In one example, the other data can facilitate a determination of a set of actions performed by an user identity associated with the pressure sensor. In another example, the other data can facilitate a determination of characteristic data indicative of a set of characteristics associated with the user identity. Block 804 may be followed by block 806. At block 806, surface data, indicative of a surface type associated with a force applied to a surface of the pressure sensor, is determined based on the data. Block 806 may be followed by block 808.

At block 808, the data is adjusted based at least on the surface data and the other data to facilitate generating adjusted data indicative of an adjusted output value generated by the pressure sensor. For example, the data can be modified based on the other data as well as the type of floor surface or the type of ground surface. In an aspect, the data can be adjusted by normalizing the data based on the surface data and the other data. For example, the data can be modified based on a normalized value associated with the surface data and the other data. In another aspect, the data can be adjusted by calculating a difference between the data and particular data generated based on the surface data and the other data. For example, the data can be modified based on the difference between the data and data generated based on the surface data and the other data. In yet another aspect, the output data can be modified by adding a data value associated with the surface data and/or a data value associated with the other data to the output data (or by subtracting a data value associated with the surface data and/or a data value associated with the other data from the output data). For example, the output data can be calibrated by a defined amount based on the surface data and the other data. In an implementation, the surface data can additionally be determined based on the other data. The surface data can be selected, for example, from the defined surface stored in the data structure based on the data and the other data.

Figure 9:
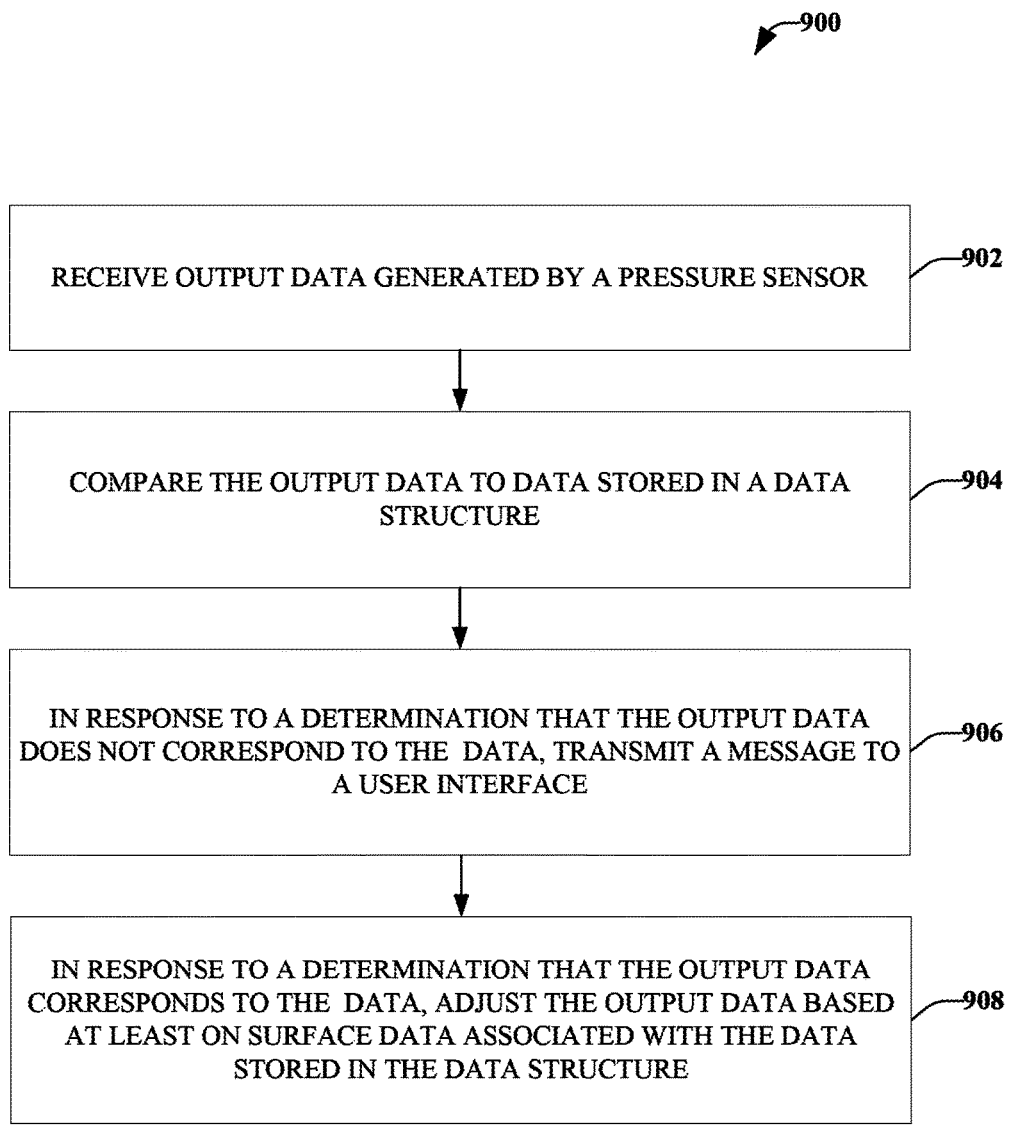

FIG. 9 is a flow diagram illustrating an example, non-limiting embodiment of a method 900 to manage and/or generate sensor data. In an aspect, the method 900 can be associated with a sensor system. The method 900 in FIG. 9 can be implemented using, for example, any of the systems, such as the system 200 (of FIG. 2), the system 300 (of FIG. 3), the system 400 (of FIG. 4), the system 500 (of FIG. 5), the system 600 (of FIG. 6), etc., described herein. The method 900 may include one or more operations, functions or actions as illustrated by one or more of blocks 902, 904, 906 and/or 908. In one embodiment, the method 900 can be associated with a wearable device (e.g., a smart shoe).

Beginning at block 902, output data generated by a pressure sensor is received. Block 902 may be followed by block 904. At block 904, the output data is compared to data stored in a data structure. For example, the output data can be compared to pressure data stored in the data structure. In another example, the output data can be compared to defined surface data stored in the data structure. The data stored in the data structure can correspond to a type of floor surface or a type of ground surface (e.g., a surface type) employed to generate the output data. For example, the data can be indicative of an indoor surface, a carpet floor surface, a wood floor surface, a concrete floor surface, a tile floor surface, a padded floor surface, an outdoor surface, a paved surface, a concrete surface, a dirt surface, a grass surface, a gravel surface, another type of surface, etc. Block 904 may be followed by block 906.

At block 906, in response to a determination that the output data does not correspond to the data, a message is transmitted to a user interface. For example, in response to a determination that a type of floor surface or a type of ground surface cannot be determined based on the output data, a message that requests a specific action by a user (e.g., an action associated with the pressure sensor) can be displayed on the user interface. Block 906 may be followed by block 908.

At block 908, in response to a determination that the output data corresponds to the data, the output data is adjusted based at least on based at least on surface data associated with the data stored in the data structure. For example, in response to a determination that a type of floor surface or a type of ground surface can be determined based on the output data, the output data can be adjusted based at least on the type of floor surface or the type of ground surface.

Figure 10:
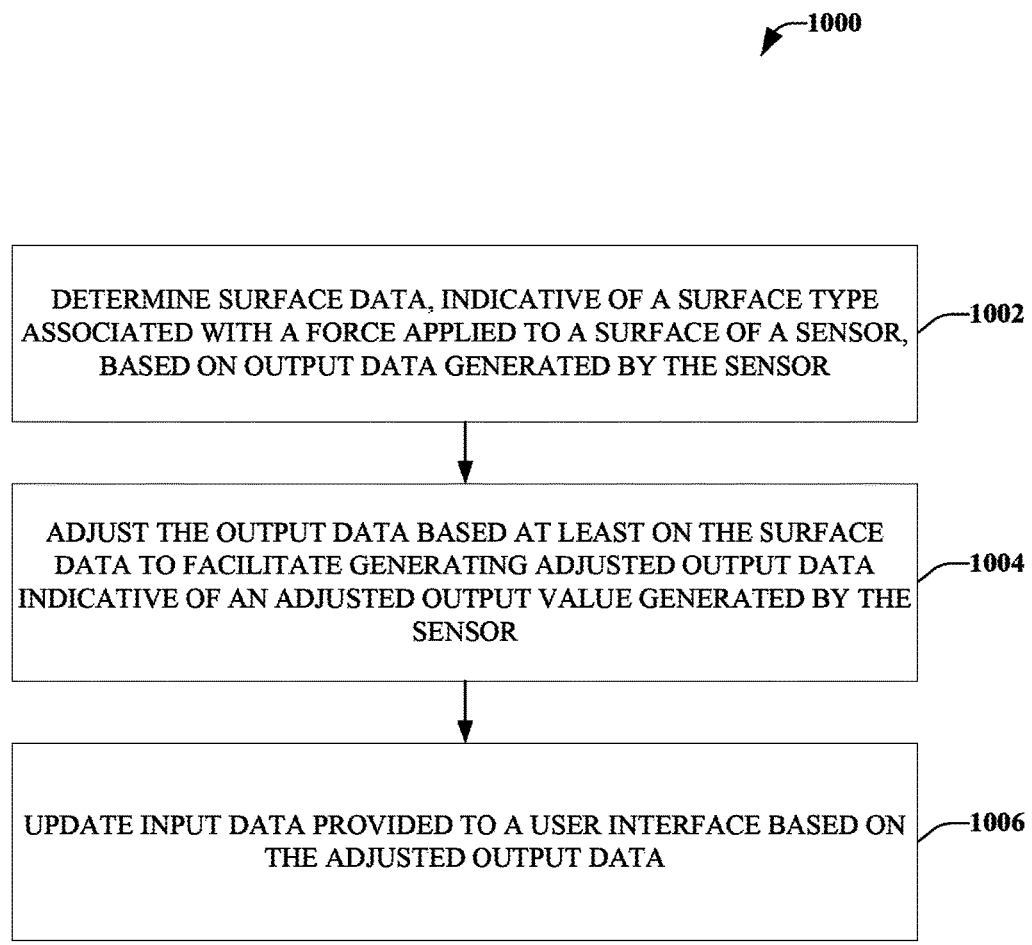

FIG. 10 is a flow diagram illustrating an example, non-limiting embodiment of a method 1000 to manage and/or generate sensor data. In an aspect, the method 1000 can be associated with a sensor system. The method 1000 in FIG. 10 can be implemented using, for example, any of the systems, such as the system 200 (of FIG. 2), the system 300 (of FIG. 3), the system 400 (of FIG. 4), the system 500 (of FIG. 5), the system 600 (of FIG. 6), etc., described herein. The method 1000 may include one or more operations, functions or actions as illustrated by one or more of blocks 1002, 1004, and/or 1006. In one embodiment, the method 1000 can be associated with a wearable device (e.g., a smart shoe).

Beginning at block 1002, surface data, indicative of a surface type associated with a force applied to a surface of a sensor, is determined based on output data generated by the sensor. The sensor can be, for example, a pressure sensor. Block 1002 may be followed by block 1004.

At block 1004, the output data is adjusted based at least on the surface data to facilitate generating adjusted output data indicative of an adjusted output value generated by the sensor. For example, the output data can be modified based on the type of floor surface or the type of ground surface. In an aspect, the output data can be adjusted by normalizing the output data based on the surface data. For example, the output data can be modified based on a normalized value associated with the surface data. In another aspect, the output data can be adjusted by calculating a difference between the output data and the surface data. For example, the output data can be modified based on the difference between the output data and the surface data. Block 1004 may be followed by block 1006.

At block 1006, input data provided to a user interface is updated based on the adjusted output data. For example, input data provided to the user interface that is generated based at least on the sensor can be modified and/or managed based on the adjusted output data. Additionally or alternatively, input data provided to an electronic device can be updated and/or managed based on the adjusted output data. In one example, the electronic device can be associated with the user interface. The electronic device can include a mobile device (e.g., a smartphone), a wearable computing device (e.g., a smartwatch), a tablet, a handheld device, a gaming device (e.g., a gaming console), a television, an interactive television, an internet-connected television, a set-top box, a streaming media device, a computer, a laptop computer, a personal digital assistant (PDA), an electronic reader (e-reader), a portable computing device, a media capable device, another type of electronic device, etc.

Figure 11:
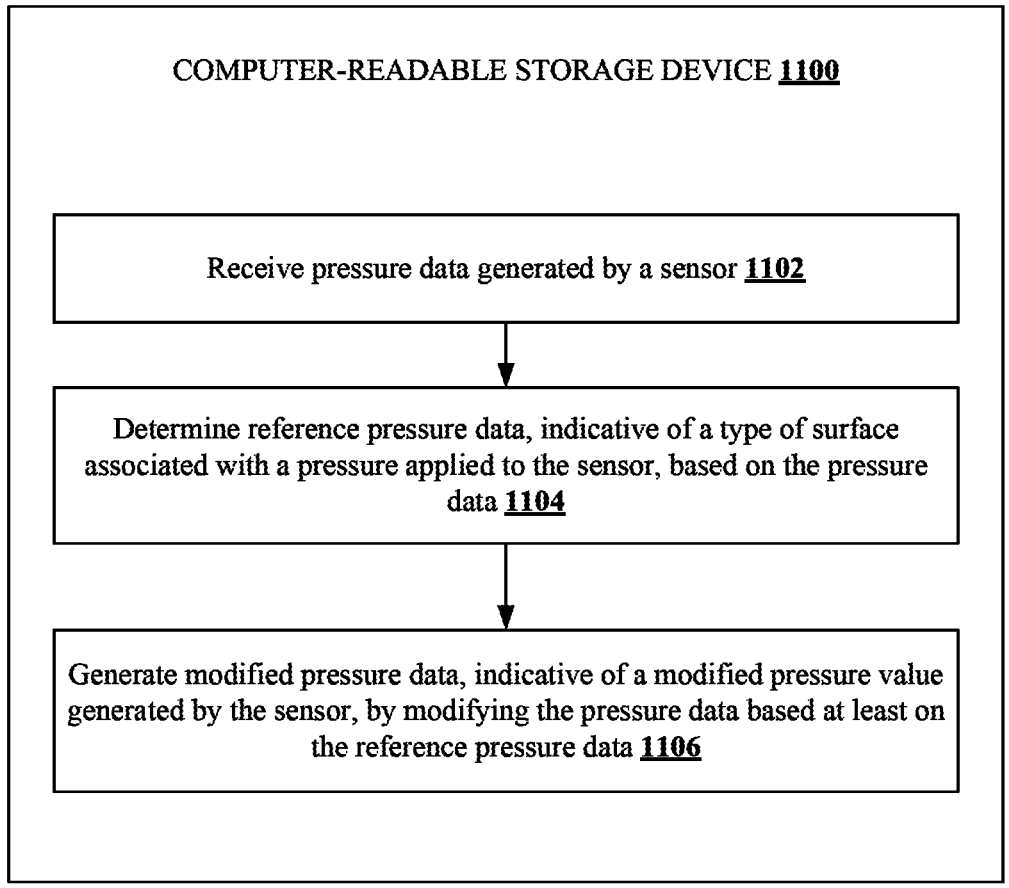
FIG. 11 illustrates a flow diagram of an example, non-limiting embodiment of a set of operations to manage and/or generate sensor data.

FIG. 11 illustrates a flow diagram of an example, non-limiting embodiment of a set of operations to manage and/or generate incentive data in accordance with at least some aspects of the subject disclosure. The computer-readable storage device 1100 may include executable instructions that, in response to execution, cause a system including a processor to perform the set of operations. The set of operations may include one or more operations, functions or actions as is illustrated by one or more of operations 1102, 1104 and/or 1106.

At operation 1102, pressure data generated by a sensor is received. For example, the sensor can be a pressure sensor embedded in a wearable device (e.g., a smart shoe). Operation 1102 may be followed by operation 1104.

At operation 1104, reference pressure data, indicative of a type of surface associated with a pressure applied to the sensor, is determined based on the pressure data. The reference pressure data can be indicative of a surface type associated with a particular pressure applied to a surface of the sensor. For example, the reference pressure data can be indicative of a type of floor surface or a type of ground surface (e.g., an indoor surface, a carpet floor surface, a wood floor surface, a concrete floor surface, a tile floor surface, a padded floor surface, an outdoor surface, a paved surface, a concrete surface, a dirt surface, a grass surface, a gravel surface, another type of surface, etc.). Furthermore, the reference pressure data can represent hardness or softness of the type of floor surface or the type of ground surface. Operation 1104 may be followed by operation 1106.

At operation 1106, modified pressure data, indicative of a modified pressure value generated by the sensor, is generated by modifying the pressure data based on the reference pressure data. In an aspect, the pressure data can be modified by normalizing the pressure data based on the reference pressure data. In another aspect, the pressure data can be modified by determining a difference between the pressure data and the reference pressure data. In yet another aspect, the pressure data can be modified by adding a defined amount associated with the reference pressure data to the output data (or by subtracting a defined amount associated with the reference pressure data from the output data). However, it is to be appreciated that the pressure data can additionally or alternatively be modified based on one or more other techniques.

Figure 12:
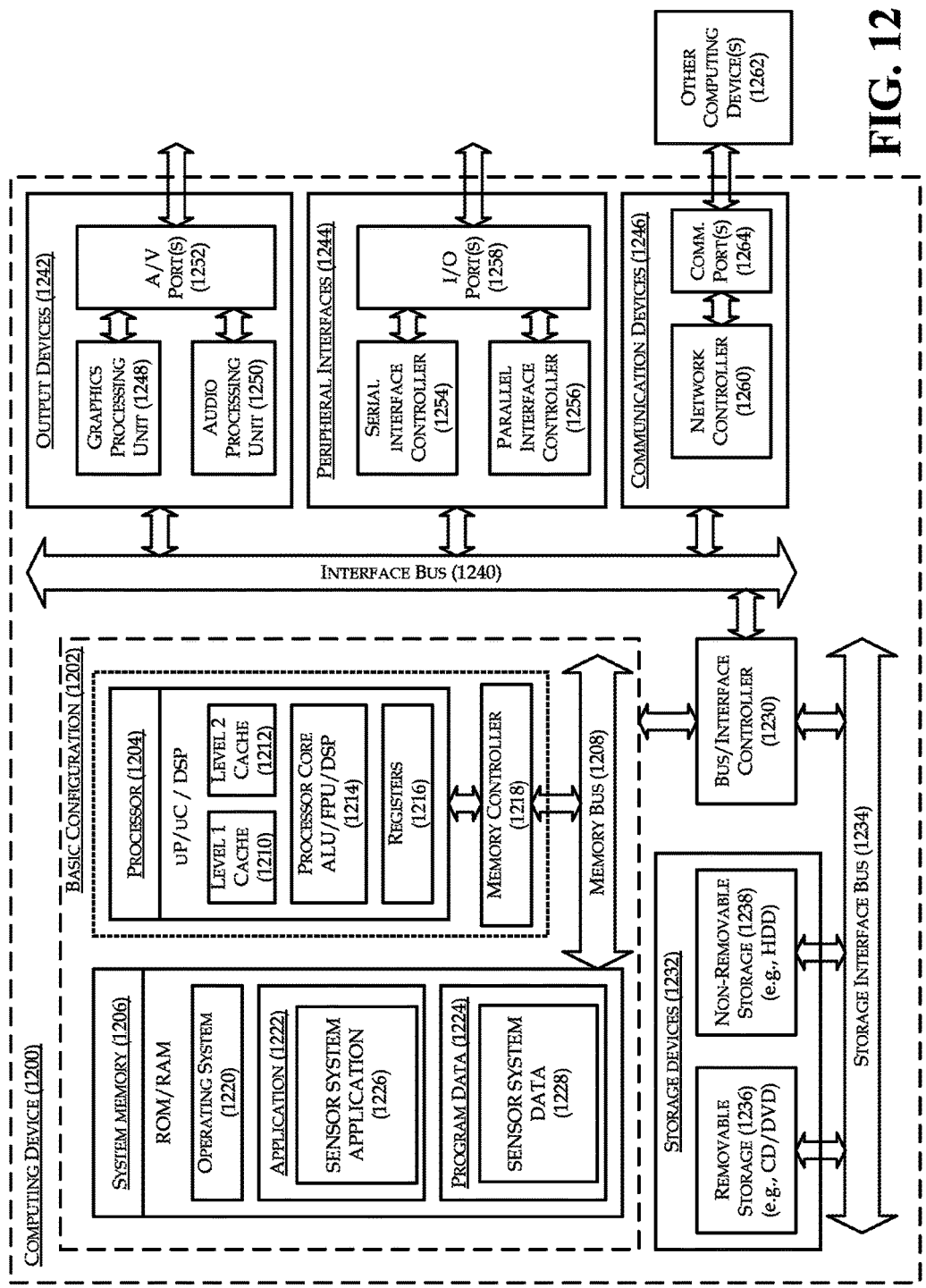
FIG. 12 illustrates an example block diagram of a computing device that is arranged to manage and/or generate sensor data in accordance with one or more embodiments described herein.

FIG. 12 illustrates an example block diagram of a computing device that is arranged to manage and/or generate sensor data in accordance with one or more embodiments described herein. In a very basic configuration 1202, a computing device 1200 typically includes one or more processors 1204 and a system memory 1206. In some embodiments, the computing device 1200 can be or include the system 200 or the system 300 (or components of the system 200 or the system 300). For example, the computing device 1200 shown in FIG. 12 can be or include structure and/or functionality associated with the sensor management component 202, the sensor component 210, the surface estimation component 212, the calibration component 214, the output component 302 and/or any number of other components/modules/devices described herein. In some embodiments, system memory 1206 may be or include the system 200 or the system 300 (or any components of the system 200 or the system 300). A memory bus 1208 may be used for communicating between a processor 1204 and a system memory 1206.

Depending on the desired configuration, a processor 1204 may be of any type including but not limited to a microprocessor (μP), a microcontroller (μC), a digital signal processor (DSP), or any combination thereof. Processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a DSP core, or any combination thereof. An example memory controller 1218 may also be used with processor 1204, or in some implementations a memory controller 1218 may be an internal part of processor 1204.

Depending on the desired configuration, system memory 1206 may be of any type including but not limited to volatile memory (such as RAM), non-volatile memory (such as ROM, flash memory, etc.) or any combination thereof. System memory 1206 may include an operating system 1220, one or more applications 1222 (e.g., a sensor system application 1226), and program data 1224 (e.g., sensor system data 1228). For example, the sensor system application 1226 can be or include one or more applications that can cause the computing device 1200 of FIG. 12 to manage and/or generate sensor data associated with the method 100, the system 200, the system 300, the system 400, the system 500, the system 600, the method 700, the method 800, the method 900 or the method 1000, as described herein. Sensor system data 1228 can be or include data (e.g., output data, surface data, defined surface data, adjusted output data, calibrated output data, weight data, other output data, user data, pressure data, first pressure data, second pressure data, reference pressure data, modified pressure data, sensor data, input data, authentication data, biometric data, posture data, etc.) employed by the method 100, the system 200, the system 300, the system 400, the system 500, the system 600, the method 700, the method 800, the method 900 or the method 1000 to manage and/or generate sensor data associated with the method 100, the system 200, the system 300, the system 400, the system 500, the system 600, the method 700, the method 800, the method 900 or the method 1000, as described herein. In some embodiments, computing device 1200 may be or be included in the system 200 or the system 300 (or one or more components of the system 200 or the system 300). In some embodiments, an application 1222 may be arranged to operate with program data 1224 on an operating system 1220 such that implementations for managing and/or generating incentive data may be performed as described herein. This described basic configuration 1202 is illustrated in FIG. 12 by those components within the inner dashed line.

Computing device 1200 may have additional features or functionality, and additional interfaces to facilitate communications between basic configuration 1202 and any required devices and interfaces. For example, a bus/interface controller 1230 may be used to facilitate communications between basic configuration 1202 and one or more data storage devices 1232 via a storage interface bus 1234. Data storage devices 1232 may be removable storage devices 1236, non-removable storage devices 1238, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1206, removable storage devices 1236 and non-removable storage devices 1238 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1200. Any such computer storage media may be part of computing device 1200.

Computing device 1200 may also include an interface bus 1240 for facilitating communication from various interface devices (e.g., output devices 1242, peripheral interfaces 1244, and communication devices 1246) to basic configuration 1202 via a bus/interface controller 1230. Example output devices 1242 include a graphics processing unit 1248 and an audio processing unit 1250, which may be configured to communicate to various external devices such as a display or speakers via one or more A/V ports 1252. Example peripheral interfaces 1244 include a serial interface controller 1254 or a parallel interface controller 1256, which may be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

Computing device 1200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 may also be implemented as a personal computer including both laptop computer and non-laptop computer configurations.

A network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The use of hardware or software may be generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems. A typical data processing system can be implemented utilizing any suitable commercially available components, such as those typically found in data computing/communication and/or network computing/communication systems.

The herein described subject matter sometimes illustrates different components contained within, or connected with, different other components. Such depicted architectures are merely examples, and many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The present disclosure is not to be limited in terms of the particular embodiments described in this application, which are intended as illustrations of various aspects. Many modifications and variations can be made without departing from its spirit and scope. Functionally equivalent methods and devices within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, computer-readable storage devices, systems or apparatus disclosed, which can, of course, vary. The terminology used herein is for the purpose of describing particular embodiments only, and is not intended to be limiting.

What is claimed is:

1. A method of using a smart shoe, the method comprising:
   receiving, by a device comprising a processor, output data generated by a pressure sensor carried by the smart shoe;
   determining, by the device, surface data indicative of a hardness of a surface associated with a force applied to a surface of the pressure sensor, wherein the determination is based on the output data and defined surface data indicative of floor surfaces;
   determining a type of the surface based on the surface data; and
   adjusting, by the device, the output data based on the type of the surface to facilitate generating adjusted output data indicative of an adjusted pressure value generated by the pressure sensor.

2. The method of claim 1, further comprising:
   receiving, by the device, weight data indicative of weight information for a user identity associated with a device that comprises the pressure sensor.

3. The method of claim 2, wherein the adjusting the output data comprises adjusting the output data based on the surface data and the weight data.

4. The method of claim 1, wherein the determining the surface data comprises comparing the output data to pressure data stored in a data structure.

5. The method of claim 4, further comprising:
   in response to determining that the output data does not correspond to the pressure data, transmitting, by the device, a message to a user interface.

6. The method of claim 1, further comprising:
   receiving, by the device, other output data generated by a gyroscope sensor, an accelerometer sensor, or an image sensor.

7. The method of claim 6, wherein the adjusting the output data comprises adjusting the output data based on the surface data and the other output data.

8. The method of claim 1, wherein the adjusting the output data comprises normalizing the output data based on the surface data.

9. The method of claim 1, wherein the adjusting the output data comprises calculating a difference between the output data and the surface data.

10. The method of claim 1, further comprising:
    updating, by the device, input data provided to a user interface based on the adjusted output data.

11. A smart shoe system, comprising:
    memory storing executable components; and
    a processor, coupled to the memory, operable to execute or facilitate execution of one or more of the executable components, the executable components comprising:
      a sensor component carried by a smart shoe, wherein the sensor component is configured to receive output data generated based on first pressure data associated with a first surface of a pressure sensor and second pressure data associated with a second surface of the pressure sensor;
      a surface estimation component configured to:
        determine surface data, indicative of a hardness of a floor surface employed to generate the first pressure data, wherein the determination is based on the output data, and
        determine a type of the floor surface,
      wherein the surface estimation component is configured to compare the output data to defined surface data indicative of defined types of floor surfaces; and
      a calibration component configured to calibrate the output data based on the surface data to generate calibrated output data indicative of a calibrated pressure value generated by the pressure sensor.

12. The system of claim 11, wherein the sensor component is configured to receive user data indicative of characteristic information for a user identity associated with a wearable device that comprises the pressure sensor.

13. The system of claim 12, wherein the surface estimation component is configured to determine the surface data based on the output data and the user data.

14. The system of claim 11, wherein the executable components further comprise an output component configured to modify input data provided to an electronic device based on the calibrated output data.

15. The system of claim 11, wherein the executable components further comprise an output component configured to generate authentication data, indicative of a password for a user identity associated with a wearable device that comprises the pressure sensor, based on the calibrated output data.

16. The system of claim 11, wherein the executable components further comprise an output component configured to generate biometric data, indicative of biometric information for a user identity associated with a wearable device that comprises the pressure sensor, based on the calibrated output data.

17. A non-transitory computer-readable storage device comprising executable instructions that, in response to execution, cause a smart shoe system comprising a processor to perform operations, comprising:
    receiving pressure data generated by a sensor;
    determining reference pressure data, indicative of a hardness of surface associated with a pressure applied to the sensor, based on the pressure data;
    determining a type of the surface based on the surface data;
    generating modified pressure data, indicative of a modified pressure value generated by the sensor, by modifying the pressure data based on the reference pressure data; and
    generating biometric data, indicative of biometric information for a user identity associated with a wearable device that comprises the sensor, based on the modified pressure data.

18. The non-transitory computer-readable storage device of claim 17, wherein the modifying the pressure data comprises normalizing the pressure data based on the reference pressure data.

19. The non-transitory computer-readable storage device of claim 17, wherein the modifying the pressure data comprises determining a difference between the pressure data and the reference pressure data.

* * * * *